(12) United States Patent
Wang et al.

(10) Patent No.: US 12,510,808 B2
(45) Date of Patent: Dec. 30, 2025

(54) LENS GROUP HOUSING, A CORRESPONDING EXTERNAL HOUSING SYSTEM AND A CAMERA MOUNTING MODULE GROUP

(71) Applicant: ZF Automotive Technologies (Shanghai) Co., Ltd, Shanghai (CN)

(72) Inventors: Zhigang Wang, Shanghai (CN); Calvin Xing, Shanghai (CN); Qinming He, Shanghai (CN); Haibin Yang, Shanghai (CN)

(73) Assignee: ZF Automotive Technologies (Shanghai) Co., Ltd, Shanghai (CN)

( * ) Notice: Subject to any disclaimer, the term of this patent is extended or adjusted under 35 U.S.C. 154(b) by 198 days.

(21) Appl. No.: 18/357,261

(22) Filed: Jul. 24, 2023

(65) Prior Publication Data

US 2024/0027879 A1  Jan. 25, 2024

(30) Foreign Application Priority Data

Jul. 22, 2022 (CN) .......................... 202221915710.3

(51) Int. Cl.
*G03B 17/12* (2021.01)
*G02B 7/02* (2021.01)
*G03B 17/16* (2021.01)

(52) U.S. Cl.
CPC ............. *G03B 17/12* (2013.01); *G02B 7/022* (2013.01); *G03B 17/16* (2013.01)

(58) Field of Classification Search
CPC ........ G03B 17/12; G03B 17/16; G02B 7/022; G02B 7/021

See application file for complete search history.

(56) References Cited

U.S. PATENT DOCUMENTS

| | | | |
|---|---|---|---|
| 2002/0089176 A1* | 7/2002 | Iwasaki ................ | G02B 7/022 285/353 |
| 2019/0361194 A1* | 11/2019 | Nunnink ............... | H04N 23/50 |
| 2021/0037172 A1* | 2/2021 | Deng ..................... | H04N 23/55 |
| 2024/0019768 A1* | 1/2024 | Ding ...................... | G02B 7/02 |

* cited by examiner

*Primary Examiner* — Abdelaaziz Tissire
(74) *Attorney, Agent, or Firm* — Kristin L. Murphy

(57) ABSTRACT

Disclosed are a lens group housing, a corresponding external housing system and a camera mounting module. The lens group housing is configured to receive the lens group, a surface of the lens group housing is provided with a limiting structure configured to limit the position of the lens group housing relative to an external housing system and the surface of the lens group housing includes a thread structure configured to connect the lens group housing to the external housing system. The external housing system comprises: a limiting matching structure corresponding to the limiting structure of the lens group housing and a nut structure configured to match the thread structure of the lens group housing such that the lens group housing is fixedly connected relative to the external housing system. The camera mounting module comprises a camera module.

13 Claims, 5 Drawing Sheets

LENS GROUP HOUSING, A CORRESPONDING EXTERNAL HOUSING SYSTEM AND A CAMERA MOUNTING MODULE GROUP

CROSS-REFERENCE TO RELATED APPLICATIONS

This application is a national stage of Chinese Application No. 202221915710.3, filed Jul. 22, 2022, the disclosure of which is incorporated herein by reference in its entirety.

TECHNICAL FIELD

The present disclosure relates generally to a lens group housing, a corresponding external housing system and a camera mounting module.

BACKGROUND

In the prior art, for a camera or a lens group module similar to a camera in an Advanced Driver Assistance System (ADAS), a lens assembly is mounted on a housing system by screw connections, and multiple threaded connection points are usually located on a back of the housing system or on a lateral side of a housing, that is, in positions that do not affect the field of view (FOV) area. However, the problem with this mounting method is that the threaded connections on the back need to occupy a relatively large space, which in turn causes the entire camera assembly to occupy a relatively large space. With the development of technology and requirements of intelligent vehicles, one hopes that the camera will become more and more compact, if not invisible, so as not to affect the overall appearance of the vehicle as much as possible. That is to say, it is hoped that the volume occupied by the camera should be as small as possible.

SUMMARY

What is needed is a camera mounting module which occupies less space. The present disclosure is directed to a lens group housing, an external housing system and a corresponding camera mounting module.

The camera mounting module comprises a camera module provided with an lens group housing, and an external housing system configured to mount the lens group housing.

The lens group housing is configured to receive a corresponding lens group, a surface of the lens group housing is provided with at least one limiting structure configured to limit a position of the lens group housing relative to an external housing system, and the external housing system has an opening through which the lens group housing protrudes; and a surface of the lens group housing is further provided with a thread structure, the thread structure being configured to connect the lens group housing to the external housing system in a relatively fixed manner. By changing the connection method between the lens group and the housing, multiple threaded connection points inside the external housing system are omitted, so that the connection between the external housing system and the lens group housing is more compact.

Advantageously, in one exemplary arrangement, the thread structure is located at an outside surface of the lens group housing.

Advantageously, in one exemplary arrangement, the at least one limiting structure comprises a front end limiting face, the front end limiting face being configured to limit the position of the lens group housing relative to the external housing system in an axial direction of the lens group.

Advantageously, in one exemplary arrangement, the at least one limiting structure comprises at least one side end limiting face, the side end limiting face being configured to restrict the lens group housing from moving relative to the external housing system in a radial direction of the lens group. Therefore, the mounting is convenient and simple, and the positioning is accurate, so that the production efficiency can be greatly improved.

Advantageously, in one exemplary arrangement, the lens group housing is further provided with an anti-rotation portion, the anti-rotation portion being configured to restrict the lens group housing from rotating about an axis of the lens group relative to the external housing system.

The present disclosure also proposes an external housing system configured to receive an lens group housing, wherein the external housing system comprises: at least one limiting matching structure corresponding to at least one limiting structure of the lens group housing, so as to limit the position of the lens group housing relative to the external housing system; and a nut structure, the nut structure being configured to match a thread structure of the lens group housing such that the lens group housing is fixedly connected relative to the external housing system.

In one exemplary arrangement, an adhesive is applied for cooperation between the nut structure and the thread structure of the lens group housing. By applying the adhesive, the nut is prevented from loosening, and/or foreign matter is prevented from entering into a thread-nut cooperation portion.

In one exemplary arrangement, the at least one limiting matching structure comprises a front end abutment face configured to cooperate with the at least one limiting structure of the lens group housing, so as to restrict the lens group housing in a first direction from moving in an axial direction of a lens group relative to the external housing system.

In one exemplary arrangement, the at least one limiting matching structure comprises an anti-rotation matching portion configured to cooperate with the at least one limiting structure of the lens group housing, so as to restrict the lens group housing from rotating about an axis of a lens group relative to the external housing system.

In one exemplary arrangement, the at least one limiting structure of the lens group housing comprises a front end limiting face and an anti-rotation portion, and the at least one limiting matching structure of the external housing system comprises a front end abutment face and the anti-rotation matching portion; wherein the anti-rotation portion is a recessed portion on the front end limiting face, and the anti-rotation matching portion is a raised portion on the front end abutment face.

In one exemplary arrangement, the at least one limiting matching structure comprises a side end abutment face provided on an inner surface of an opening and configured to cooperate with the at least one limiting structure of the lens group housing, so as to restrict the lens group housing from moving relative to the external housing system in a radial direction of a lens group.

In one exemplary arrangement, the at least one limiting structure of the lens group housing comprises a side end limiting face, and the side end limiting face and the side end abutment face are respectively cylindrical surfaces having the same diameter. Therefore, the machining of the side end limiting face and the side end abutment face is easier.

The present disclosure also proposes a camera mounting module. The camera mounting module comprises: a camera module provided with a lens group housing of the present disclosure, and an external housing system of the present disclosure.

In one exemplary arrangement, the camera module is directly or indirectly connected to a vehicle via the external housing system.

DETAILED DESCRIPTION

According to an exemplary arrangement of the present disclosure, provided is a camera mounting module, comprising a camera module provided with a lens group housing, and an external housing system configured to mount the lens group housing.

The camera module comprises an imaging module that uses a lens group to realize functions such as shooting and scanning. In one exemplary arrangement, the camera module is an imaging module that may be used in an ADAS system.

In one exemplary arrangement, the camera module includes an optical camera, a webcam, a Lidar camera, etc. The lens group includes but is not limited to one or more lens groups, and a combination of transparent and reflective lenses.

Figure 1:
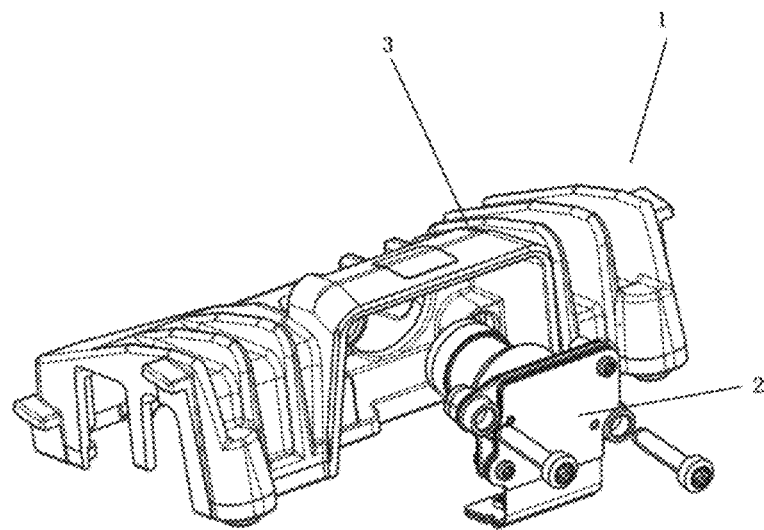
FIG. 1 shows a perspective view of a camera mounting module according to the prior art.

FIG. 1 shows a camera mounting module according to the prior art.

In the camera mounting module, the lens group housing 2 of the lens group is mounted to an external housing system by screwing through screw holes provided on the back of the lens group. The multiple threaded connection points are usually located on the back of the housing system, but may also be located on the side of the housing, in positions that do not interfere with the field of view (FOV) area.

Figure 2:
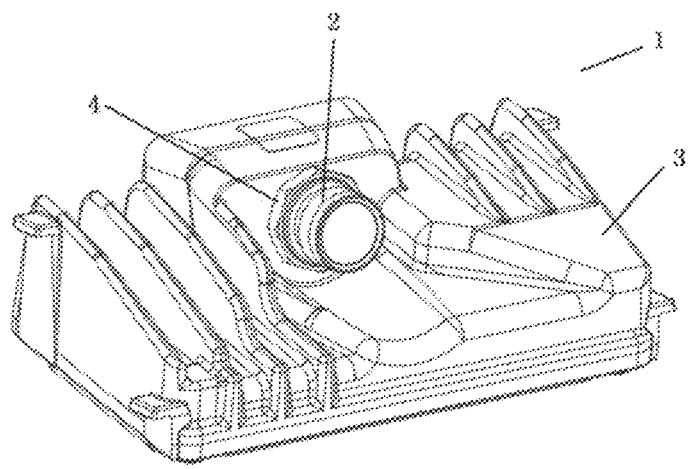
FIG. 2 shows a perspective view of a camera mounting module according to an exemplary arrangement of the present disclosure.
Figure 3:
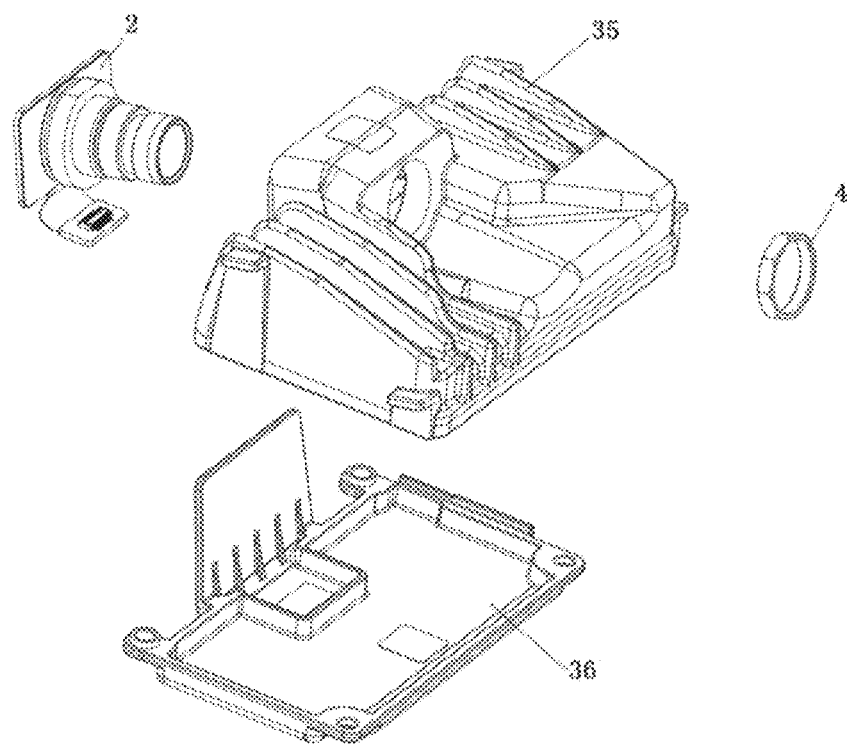
FIG. 3 shows an exploded view of a camera mounting module according to an exemplary arrangement of the present disclosure.

FIG. 2 shows a camera mounting module 1 according to the present disclosure. FIG. 3 shows an exploded view of a camera mounting module according to the present disclosure. A camera module in the camera mounting module 1 is also a scanning or shooting camera that may be used in the ADAS system. The camera mounting module 1 comprises an external housing system 3, a lens group housing 2 which can protrude from an opening 37 of the external housing system 3, and a nut structure 4 that matches an external thread on the lens group housing. The outer housing system 3 comprises an upper housing 35 and a lower housing 36. The camera module is directly or indirectly connected to a vehicle via the external housing system 3.

The indirect connection includes in that the external housing system 3 may be firstly connected to an intermediate mounting bracket, and then connected to the vehicle via the intermediate mounting bracket.

Figure 4:
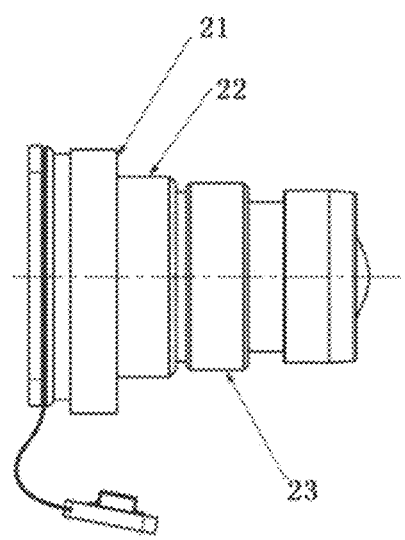
FIG. 4 shows a left side view of a camera module according to an exemplary arrangement of the present disclosure.
Figures 5A, 5B:
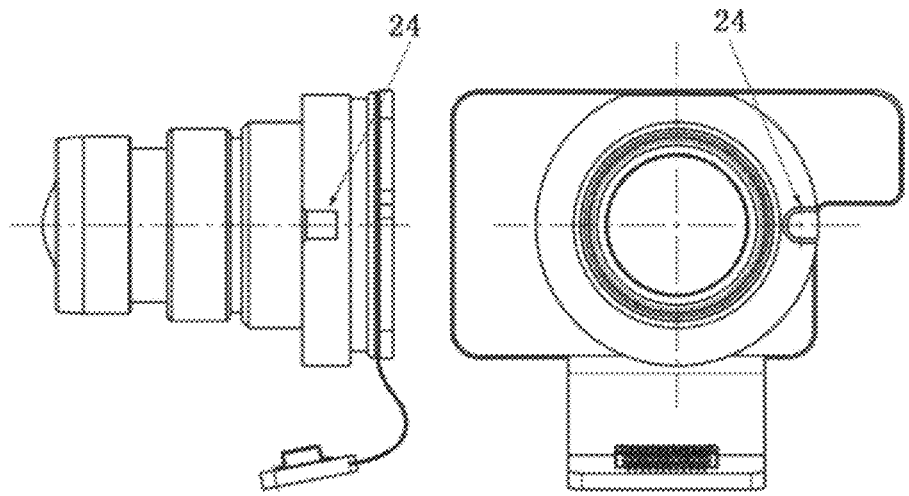
FIGS. 5a and 5b show a right side view and a front view of the camera module shown in FIG. 4, respectively.
Figure 6:
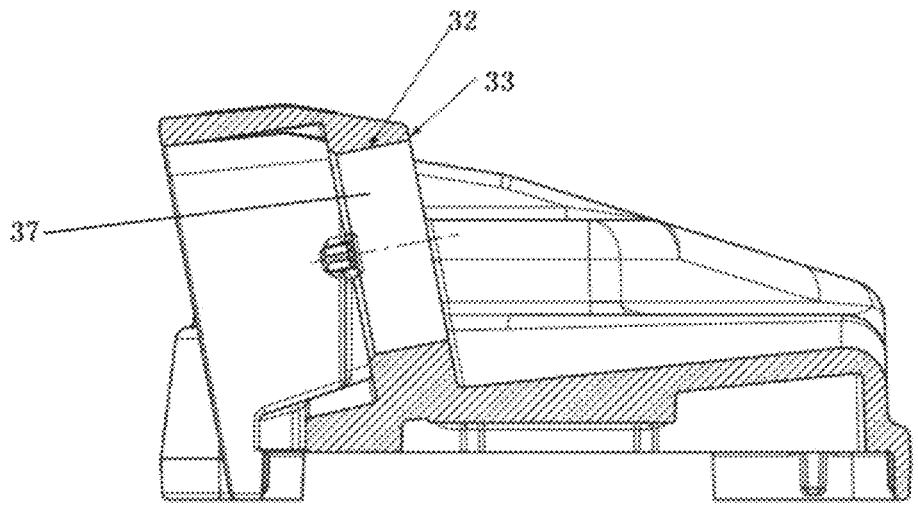
FIG. 6 shows a cross-sectional view of an external housing system according to an exemplary arrangement of the present disclosure.
Figure 7:
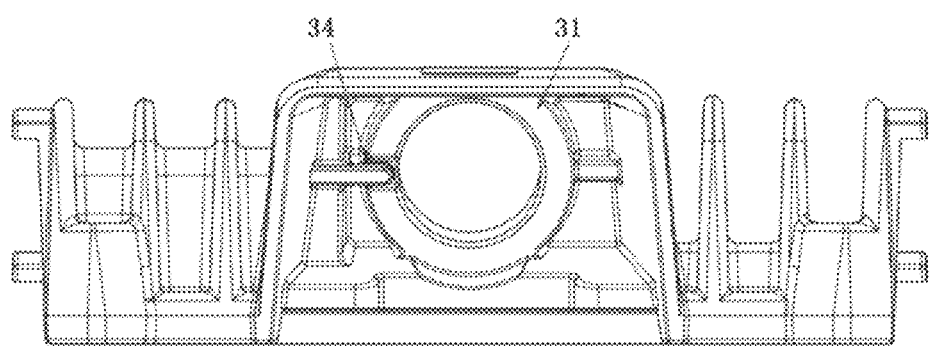
FIG. 7 shows a rear view of an external housing system according to an exemplary arrangement of the present disclosure.
Figure 8:
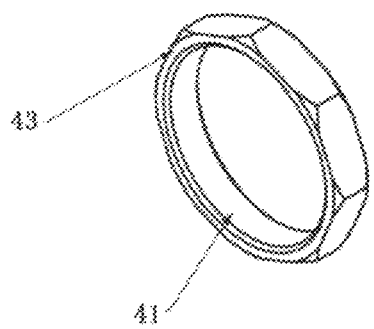
FIG. 8 shows a perspective view of a nut structure of an external housing system according to an exemplary arrangement of the present disclosure.

FIG. 4 shows a left side view of a camera module according to an exemplary arrangement of the present disclosure. The camera module comprises a lens group housing 2 and a corresponding lens group. FIGS. 5a and 5b show a right side view and a front view of the relevant camera module, respectively. FIG. 6 shows a cross-sectional view of an external housing system. FIG. 7 shows a rear view of an external housing system. FIG. 8 shows a perspective view of a nut structure of an external housing system. To fix the lens group housing 2 relative to the external housing system, the lens group housing 2 is provided with a thread structure 23 and at least one limiting structure. In one exemplary arrangement, the thread structure 23 is a thread provided on an outer surface of the lens group housing 2. A nut structure 4 matches the thread structure 23. Through the cooperation between the thread structure 23 and a thread 41 of the nut structure 4, when the nut structure is rotated, the thread structure can move in an axial direction. The thread structure 23 is arranged in front of a side end limiting face 22 in the axial direction.

The at least one limiting structure may comprise one or more of the following structures:

1) A front end limiting face 21 is provided. The front end limiting face 21 is a flat face perpendicular to an axis of the lens group housing.
2) The side end limiting face 22 is provided. The side end limiting face 22 is an outer circumferential surface arranged in front of the front end limiting face 21 in the axial direction.
3) An anti-rotation portion 24 is provided. The anti-rotation portion 24 is a recessed portion provided on the front end limiting face 21.

In the present disclosure, the front, rear, inside and outside of the lens group and the related external housing system are determined according to the direction in which incident light rays enter the lens group. The incident light rays enter the lens group from outside to inside and from front to rear. In the present application, the side of the external housing system close to the outer side of the incident light rays is called front, and the side of the external housing system close to the inner side of the incident light rays is called rear.

The external housing system 3 is provided, on the inner side, with a front end abutment face 31 for abutting against the front end limiting face 21 to prevent the lens group housing 2 from moving out of the external housing system 3. Furthermore, the external housing system 3 is provided with an opening 37 for allowing the lens group housing 2 to protrude from the external housing system 3. An inner surface of the opening 37 is provided with a cylindrical side end abutment face 32. The side end limiting face 22 abuts against the side end abutment face 32 to prevent the lens group housing 2 from moving relative to the external housing system 3 in a direction perpendicular to the axial direction. A locking end face 33 is provided on the outer side of the opening 37, such that when the nut structure 4 is rotated inward, an end face 43 of the nut structure 4 abuts against the locking end face 33 to prevent the lens group housing 2 from moving into the external housing system 3.

The front end abutment face 31 is provided with a raised portion protruding towards the inner side of the external housing system 3, and the raised portion forms an anti-rotation matching portion 34. The anti-rotation portion 24 is engaged in the anti-rotation matching portion 34 to prevent the lens group housing 2 from rotating about the axis of the lens group relative to the external housing system 3.

Figure 9:
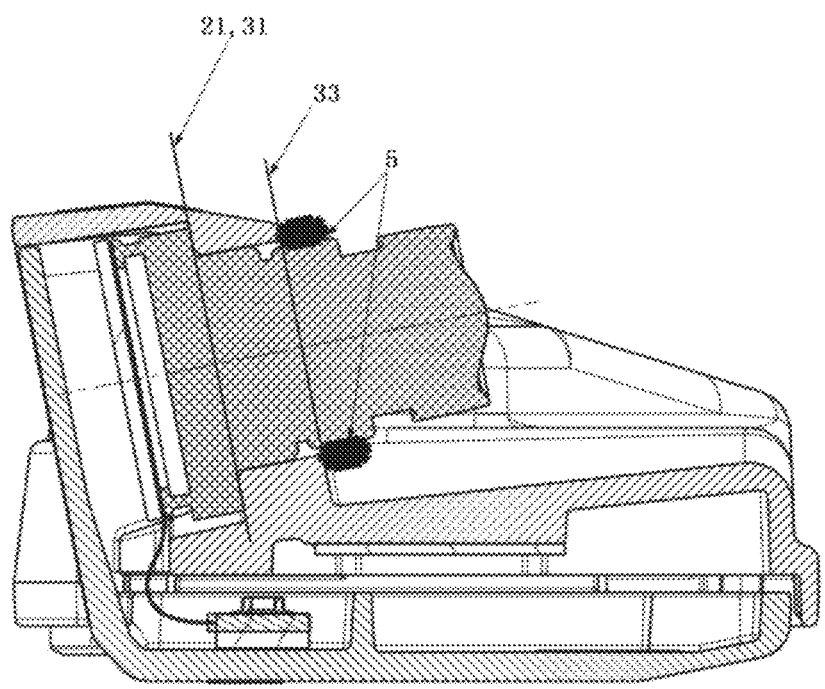
FIG. 9 shows a cross-sectional view of a camera mounting module according to an exemplary arrangement of the present disclosure.

FIG. 9 shows a cross-sectional view of a camera mounting module according to the present disclosure. In the exemplary arrangement shown, an adhesive 5 is applied to an inner surface of the nut structure 4, so that the nut structure 4 and the lens group housing 2 are bonded together after the nut structure 4 is tightened.

In the camera mounting module according to the present disclosure, by providing the lens group housing with a thread, a threaded connection is realized by using the nut structure adapted to the size of the lens group housing. The threaded connection may be provided on the outer side of the external housing system without blocking the field of view of the lens group itself. The overall structure is more compact, and additional parts such as nuts and screws are omitted, so that the number of mounting steps is reduced while reducing the cost, and the mounting efficiency is improved.

The invention claimed is:

1. A lens group housing configured to receive a corresponding lens group, comprising:
 a surface of the lens group housing being provided with at least one limiting structure configured to limit a position of the lens group housing relative to an external housing system, the at least one limiting structure comprising a front end limiting face, the front end limiting face being configured to limit the position of the lens group housing relative to the external housing system in an axial direction of the lens group, wherein the external housing system has an opening through which the lens group housing protrudes;
 wherein the lens group housing is further provided with an anti-rotation portion, the anti-rotation portion being configured to restrict the lens group housing from rotating about an axis of the lens group relative to the external housing system, the anti-rotation portion being configured as a recessed portion provided on the front end liminting face;
 and a surface of the lens group housing is further provided with a thread structure, the thread structure being configured to connect the lens group housing to the external housing system in a relatively fixed manner.

2. The lens group housing according to claim 1, wherein the thread structure is located at an outside surface of the lens group housing.

3. The lens group housing according to claim 2, the at least one limiting structure comprises at least one side end limiting face, the side end limiting face being configured to restrict the lens group housing from moving relative to the external housing system in a radial direction of the lens group.

4. The lens group housing according to claim 1, wherein the at least one limiting structure comprises at least one side end limiting face, the side end limiting face being configured to restrict the lens group housing from moving relative to the external housing system in a radial direction of the lens group.

5. A camera mounting module, comprising: a lens group housing of claim 1; and an external housing system.

6. The camera mounting module according to claim 5, wherein the camera module is directly or indirectly connected to a vehicle via the external housing system.

7. An external housing system configured to receive an lens group housing, comprising:
 at least one limiting matching structure corresponding to at least one limiting structure of the lens group housing, so as to limit the position of the lens group housing relative to the external housing system;
 wherein the at least one limiting matching structure comprises a front end abutment face configured to cooperate with the at least one limiting structure of the lens group housing so as to restrict the lens group housing in a first direction from moving in an axial direction of a lens group relative to the external housing system; and
 a nut structure, the nut structure being configured to match a thread structure of the lens group housing such that the lens group housing is fixedly connected relative to the external housing system.

8. The external housing system according to claim 7, wherein an adhesive is applied for cooperation between the nut structure and the thread structure of the lens group housing.

9. The external housing system according to claim 8, wherein the at least one limiting matching structure comprises an anti-rotation matching portion configured to cooperate with the at least one limiting structure of the lens group housing, so as to restrict the lens group housing from rotating about an axis of a lens group relative to the external housing system.

10. An external housing system configured to receive an lens group housing, comprising:
 at least one limiting matching structure corresponding to at least one limiting structure of the lens group housing, so as to limit the position of the lens group housing relative to the external housing system; and
 wherein the at least one limiting matching structure comprises an anti-rotation matching portion configured to cooperate with the at least one limiting structure of the lens group housing, so as to restrict the lens group housing from rotating about an axis of a lens group relative to the external housing system;
 wherein the at least one limiting structure of the lens group housing also comprises a front end limiting face and an anti-rotation portion, and the at least one limiting matching structure of the external housing system comprises a front end abutment face and the anti-rotation matching portion; wherein the anti-rotation portion is a recessed portion on the front end limiting face, and the anti-rotation matching portion is a raised portion on the front end abutment face; and
 a nut structure, the nut structure being configured to match a thread structure of the lens group housing such that the lens group housing is fixedly connected relative to the external housing system.

11. An external housing system configured to receive an lens group housing, comprising:
 at least one limiting matching structure corresponding to at least one limiting structure of the lens group housing, so as to limit the position of the lens group housing relative to the external housing system, wherein the at least one limiting matching structure comprises a side end abutment face provided on an inner surface of an opening and configured to cooperate with the at least one limiting structure of the lens group housing, so as to restrict the lens group housing from moving relative to the external housing system in a radial direction of a lens group; and a nut structure, the nut structure being configured to match a thread structure of the lens group housing such that the lens group housing is fixedly connected relative to the external housing system.

12. The external housing system according to . claim 11, wherein the at least one limiting structure of the lens group housing comprises a side end limiting face, and the side end limiting face and the side end abutment face are respectively cylindrical surfaces having the same diameter.

13. The external housing system according to claim 11, wherein an adhesive is applied for cooperation between the nut structure and the thread structure of the lens group housing.

* * * * *